UNITED STATES PATENT OFFICE.

IVORY W. EMERSON AND GEORGE A. EMERSON, OF LEWISTON, MAINE.

IMPROVEMENT IN SALVES.

Specification forming part of Letters Patent No. 177,387, dated May 16, 1876; application filed January 27, 1876.

*To all whom it may concern:*

Be it known that we, IVORY W. EMERSON and GEORGE A. EMERSON, both of Lewiston, in the county of Androscoggin and State of Maine, have invented certain new and useful Improvements in Medical Compounds or Salves; and we do hereby declare that the following is a full, clear, and exact description thereof, which will enable others skilled in the art to which it pertains to make and use the same.

The purpose of our invention is the production of an improved salve or unguent for the cure of scratches in horses, bruises, galls, calks, fistula, corns, and quarter-cracks. It is also applicable to chapped hands, chilblains, surface humors, and such like diseases.

The component parts of my medicine are aqua fortis, blue vitriol, glycerine, alum, red precipitate, sulphur, and hog's lard.

To show the relative proportions, I give the following formula: aqua fortis, one ounce; blue vitriol, one-half ounce; glycerine, one ounce; alum, one-half ounce; red precipitate, one ounce; sulphur, one ounce; hog's lard, twelve ounces.

To prepare the salve, take the above-named ingredients, with the exception of the aqua fortis, and heat or simmer the same gently for a period of thirty minutes, after which time, and while the compound is still hot, add the aqua fortis. When cooled it forms a salve, and is ready for application.

When intended for use on human beings the quantity of lard should be doubled from what is specified above.

This salve is valuable for a variety of skin diseases not herein specified.

What we claim as our invention, and desire to secure by Letters Patent, is—

The compound of aqua fortis, blue vitriol, glycerine, alum, red precipitate, sulphur, and hog's lard, in the proportions herein described, for the purposes set forth.

In testimony that we claim the foregoing as our own we affix our signature in presence of two witnesses.

IVORY W. EMERSON.
GEO. A. EMERSON.

Witnesses:
L. P. WOODBURY,
D. T. WRIGHT.